United States Patent
Maruska et al.

(10) Patent No.: US 6,401,158 B1
(45) Date of Patent: Jun. 4, 2002

(54) APPARATUS FOR PROVIDING A CPU CLUSTER VIA A DISK I/O BUS USING A CPU BRICK WHICH FITS INTO A DISK CAVITY

(75) Inventors: David William Maruska, Hopkinton; Jonathan Clark Crowell, Boston, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/092,622

(22) Filed: Jul. 16, 1993

(51) Int. Cl.[7] ............................................... G06F 13/38
(52) U.S. Cl. ........................................................ 710/305
(58) Field of Search ................................. 395/800, 281; 364/DIG. 1; 361/796, 752, 684, 689, 754; 360/69

(56) References Cited

U.S. PATENT DOCUMENTS

| | | | | |
|---|---|---|---|---|
| 4,716,526 A | * | 12/1987 | Mori et al. ............. 364/DIG. 1 |
| 4,728,160 A | * | 3/1988 | Mondor et al. ............. 312/236 |
| 5,233,594 A | * | 8/1993 | Wilhelm ..................... 369/75.1 |
| 5,237,484 A | * | 8/1993 | Ferchau et al. ............. 361/689 |
| 5,253,129 A | * | 10/1993 | Blackborow et al. ......... 360/69 |
| 5,271,152 A | * | 12/1993 | Murphy ........................ 29/830 |
| 5,297,000 A | * | 3/1994 | Freige et al. ................ 361/692 |
| 5,299,089 A | * | 3/1994 | Lwee .......................... 361/684 |
| 5,359,728 A | * | 10/1994 | Rusnack et al. ............. 395/575 |
| 5,401,176 A | * | 3/1995 | Lwee ........................... 439/64 |
| 5,463,742 A | * | 10/1995 | Kobayashi .................. 395/281 |

* cited by examiner

Primary Examiner—John A. Follansbee
(74) Attorney, Agent, or Firm—Cesari and McKenna, LLP

(57) ABSTRACT

A general purpose computer apparatus including a central processing unit, a main memory and a system bus. The general purpose computer apparatus further includes means for interfacing the central processing unit to the system bus and means for interfacing the central processing unit to an I/O bus. A housing encloses the central processing unit, the main memory and the means for interfacing, with the housing having a mechanical form factor corresponding to a disk drive housing.

14 Claims, 6 Drawing Sheets

APPARATUS FOR PROVIDING A CPU CLUSTER VIA A DISK I/O BUS USING A CPU BRICK WHICH FITS INTO A DISK CAVITY

BACKGROUND OF THE INVENTION

This invention relates generally to computer systems and more particularly to clustered computer systems.

As is known in the art, a computer system is generally comprised of a central processing unit (CPU), a memory unit, at least one input/output device, and a bus which is used to connect the aforementioned devices. The computer is housed in a cabinet which contains a power supply to supply power for the various components of the computer. In operation, the central processing unit fetches and decodes incoming instructions, executes commands, and manipulates data, while the memory unit, which is composed of multiple storage locations, stores data to be used by the CPU. The I/O device is generally used to input data to and output data from the computer system. Typical types of I/O devices include printers, keyboards, displays and mass storage units such as disk drives etc. These devices are often interfaced to the computer-system with an I/O interface controller circuit.

Often, a user's processing needs will grow beyond the capabilities of a single CPU. In an effort to meet these new processing needs, computers are typically clustered to make a plurality of CPUs available for processing. A clustered computer system is an integrated group of computers that communicate over a high-speed communication path. The clustered computer system acts as a single system to users. That is, clustered computer systems are characterized by a high degree of transparent resource sharing, which includes access by each individual computer system to storage located anywhere in the clustered system, and increased processing throughput.

In a typical cluster, there are two or more CPUs sharing inter alia at least one common system disk. Using multiple CPUs in a clustered configuration enables processing time on the CPUs to be used more efficiently. Thus, it affords the user better performance when jobs are run on a clustered system.

At least one additional general purpose computer is necessary to provide a clustered configuration for a computer system. Depending upon the characteristics of an existing system it may be possible to acquire an additional CPU and associated cabinet and power supply and interconnect these devices with the existing equipment. The two systems are connected through the additional cables and harnessing and are configured using software to behave as a clustered computer system. While the existing equipment and acquired general purpose computer system will provide a clustered computer system there are several drawbacks to this approach. For example, included with each general purpose computer system is a power supply and the cabinet as well as additional hardware such as cables and harnessing to connect the two computer systems. Clustering computer systems using this approach provides a redundancy in the hardware of the computer system, but at a substantial increase in cost particularly for the mechanical components necessary to provide the clustered system. Moreover, by providing separate cabinets, longer cables and harnesses are needed to interconnect the systems. This limits the maximum number of systems which can be interconnected, particularly for executing bus specification protocols, due to electrical timing and parameter considerations.

Another option available to provide additional processing power is multiprocessing. A single processing board can be used which includes multiple CPUs. This option however is not only costly but it assumes the user has foreseen a future need for an increase in processing power.

SUMMARY OF THE INVENTION

In accordance with the present invention, a general purpose computer apparatus includes a central processing unit, a main memory, and a system bus. The general purpose computer apparatus further includes means for interfacing the central processing unit to the system bus and means for interfacing the central processing unit to an I/O bus. The general purpose computer system further includes a housing enclosing the central processing unit, the main memory and the means for interfacing with the housing having a mechanical form factor corresponding to a disk drive housing with such an arrangement, the general purpose computer apparatus is housed in a chassis or housing which can be disposed within a disk drive slot of a standard general purpose computer cabinet. By appropriate interconnect and configuration of the apparatus with a second general purpose computer in the general purpose computer cabinet a clustered computer system can be provided.

In accordance with a further aspect of the present invention, a computer system includes a cabinet having at least one slot for receiving a disk drive, and a first general purpose computer apparatus disposed in the cabinet. The first general purpose computer apparatus includes a first central processing unit, a system bus, and an I/O interface module coupled to said system bus for interfacing said system bus to an I/O bus. The computer system further includes a second general purpose computer apparatus which includes a second central processing unit, a main memory, and means for interfacing the second general purpose computer apparatus to the first general purpose computer apparatus. The second general purpose computer apparatus further includes a housing enclosing the second general purpose computer apparatus, the housing having a mechanical form factor corresponding to the slot for receiving a disk drive, with the housing disposed in the slot. With such an arrangement a clustered computer system configuration may be provided by appropriate interconnect and configuration of the second general purpose computer apparatus with the first general purpose computer in the general purpose computer cabinet while saving the cost of an additional cabinet, power supply, cabling and harnessing. In addition, since the length of cabling will in general be shorter than prior approaches, more systems can be clustered on one bus. For example, if the systems are clustered over a DSSI bus, a total of eight systems may be clustered without violating electrical specifications for DSSI bus clusters rather than the maximum of three systems when the systems are housed in separate cabinets and longer lengths of cabling are necessary to interconnect the systems.

In accordance with a further aspect of the present invention, a computer system includes a cabinet for housing the computer system, the cabinet having a panel with at least two openings in the panel of the cabinet. The computer system further includes a power supply disposed within the cabinet and a first general purpose computer disposed within the cabinet. The first general purpose computer further includes a first central processing unit module, including a central processing unit, a main memory, an I/O adapter interface, and a system bus coupling the first central processing unit module to the main memory and the I/O adapter interface. The computer system further includes a disk drive disposed in a first one of the openings in the panel of the cabinet and a second general purpose central processing unit module disposed in a second one of the openings in the panel of the cabinet and coupled to the cabinet by the corresponding receiving means. The second general purpose central processing unit module further includes a control panel having at least one switch which is used to reboot the second central processing unit module. The first central processing unit module and the second central processing unit module receive power from the power supply. With such an arrangement the existing equipment may be connected to the general purpose central processing unit module to provide a multiprocessing system thus, saving the user the cost of a complete multiprocessing system as well as in some cases protecting an investment made in existing equipment.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENTS

Figure 1:
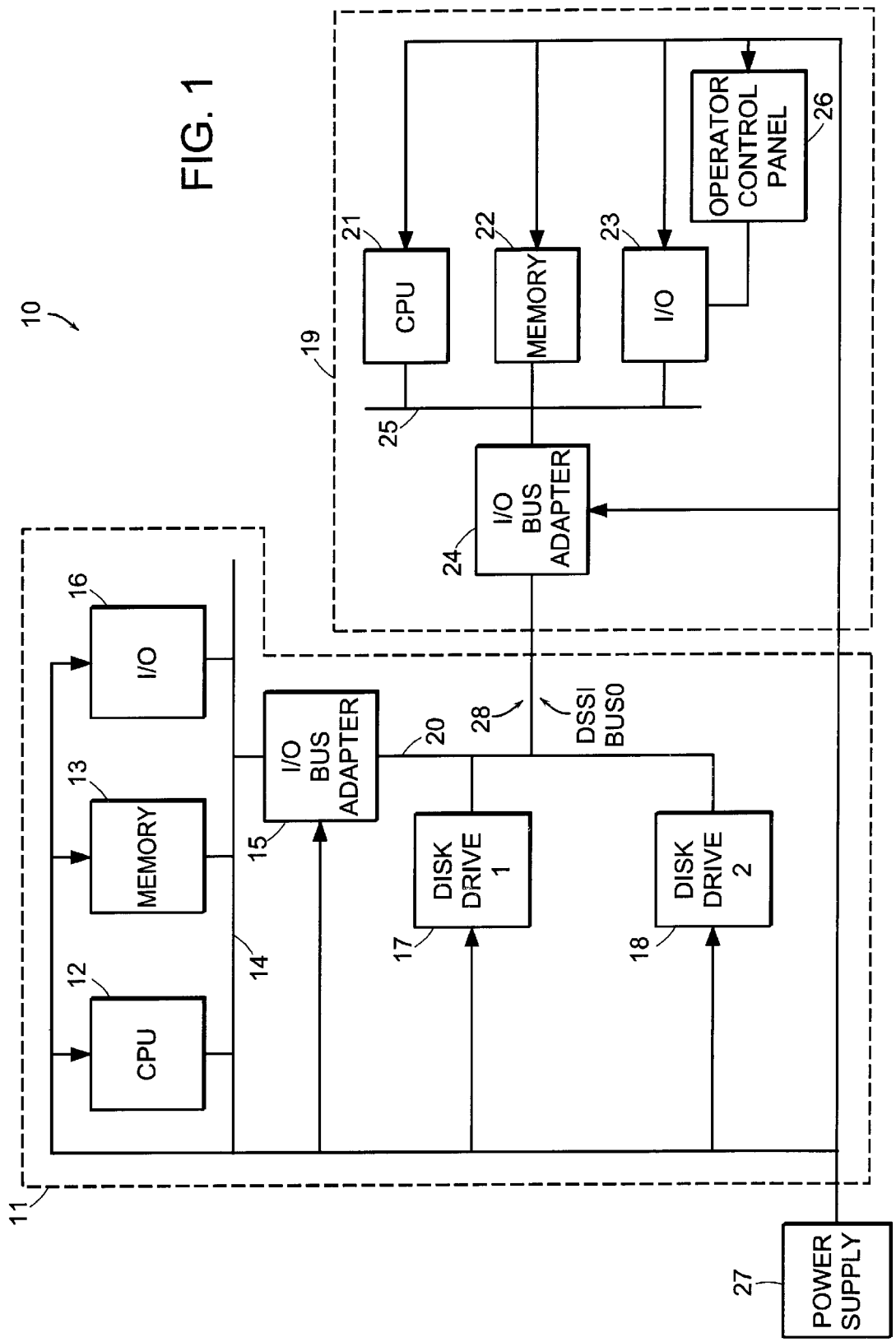
FIG. 1 is a block diagram of a general purpose, clustered computer system.

Referring now to FIG. 1, a general purpose, clustered computer system 10 is shown to include a general purpose computer 11 having inter alia a Central Processing Unit (CPU) 12, a system memory 13, I/O 16 and an I/O bus adapter 15 all interconnected via a system bus 14. CPU 12 typically includes a microprocessor device, interface circuits and timing and control circuits and is used to process computer instructions, generally fetched from system memory 13, in a predetermined manner to complete some computer processing task. System memory 13 typically includes a plurality of integrated circuit memory devices such as dynamic random access memory (DRAM) or static random access memory (SRAM) which provide main data storage for the CPU. The I/O bus adapter 15 is further coupled to two disk drives 17 and 18 through an I/O bus 20.

The general purpose, clustered computer system further includes a second general purpose computer 19 including a CPU 21, a system memory 22, I/O 23 and an I/O bus adapter 24 each communicating through a system bus 25. In general the second general purpose computer system 19 provides similar functionality as general purpose computer system 11. Further included in the second general purpose computer 19 is an operator control panel 26 which provides an operator control over the second general purpose computer 19. The clustered general purpose computer is also shown to include a single power supply 27, which provides all appropriate voltages such as five volts for the logic devices and twelve volts for the electromechanical devices in the disk drive. That is the power supply here supplying power to each module of the first general purpose computer as well as to each of the disk drives and each module of the second general purpose computer 19. General purpose computer 11 and general purpose computer 19 are logically connected through a Digital Storage System Interconnect (DSSI) Bus 28 here referred to as DSSI bus_0.

Figure 2:
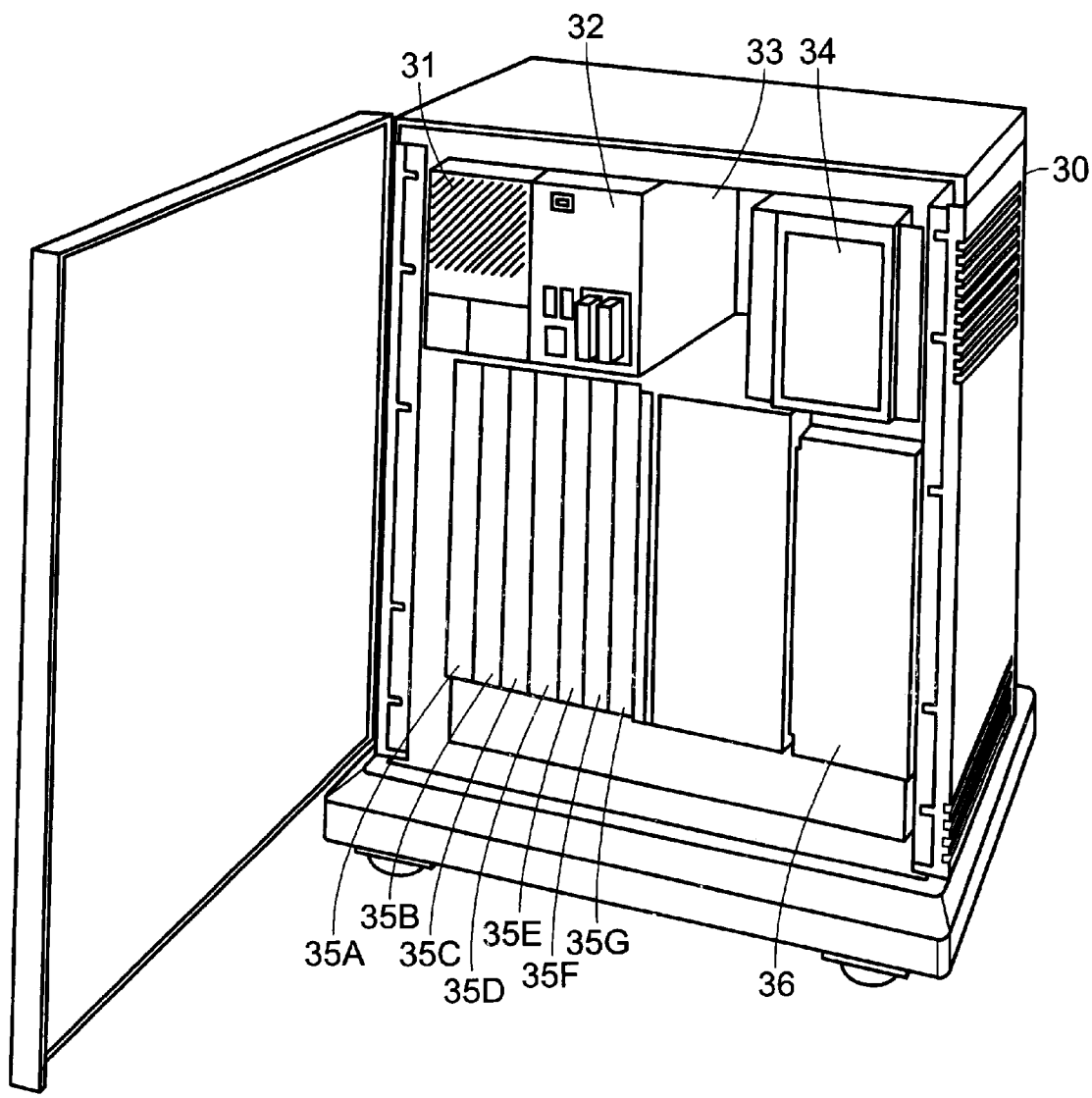
FIG. 2 is an isometric view of a computer system cabinet housing the general purpose, clustered computer system of FIG. 1.

Referring now to FIG. 2, a system cabinet 30 to house the general purpose, clustered computer system of FIG. 1 is shown. The first general purpose computer system 11 and power supply 27 are housed within the lower portion of the cabinet here depicted by modules 35a–35g. The power supply 27 is depicted here as being located in the right hand portion 36, as shown. The cabinet 30 further has openings to accommodate here, three disk drives. Housed in one of the disk drive openings is the second general purpose computer 19 including the CPU module, the memory module, the system bus, and the I/O adapter interface as discussed above appropriately packaged 32. Here, shown housed in one of the remaining disk drive openings, is a disk drive 31. The third disk drive slot 33 is shown empty. Also shown included in the system cabinet 30 is a tape drive 34. The packaged 32, second general purpose computer system 19 of FIG. 1, is located within the disk drive opening and is physically and logically connected through the standard disk drive connections, including power and an I/O bus capable of supporting CPU to CPU communication protocol. Examples of bus protocols include a system bus protocol, a network protocol and an I/O bus protocol. Preferably, the bus protocol is the Digital Storage System Interconnect (DSSI).

A DSSI bus is a general purpose communication bus. The DSSI bus is used to connect host computers and storage devices. It is similar in function to a Computer Interconnect (CI) bus protocol which is used for interconnecting medium to large computer systems into clusters. The DSSI bus, like the CI bus, operates using the System Communication Architecture protocols. The DSSI bus is the preferable bus because it operates at a high level thus handling error conditions more effectively. Because the electrical specifications for a DSSI bus cluster are very stringent regarding the lengths of the electrical paths, the maximum number of nodes on a DSSI bus cluster is three when a typical configuration using separate cabinets for each system is used. By connecting additional general purpose computer systems through the DSSI ports in the disk drive slots, shorter electrical paths result, thus allowing the maximum number of general purpose computer systems which may be connected through this process to increase up to eight.

Through these connections and some additional clustering software, the general purpose computer system apparatus is connected in a cluster configuration with the general purpose computer housed within the main cabinet.

Figure 3:
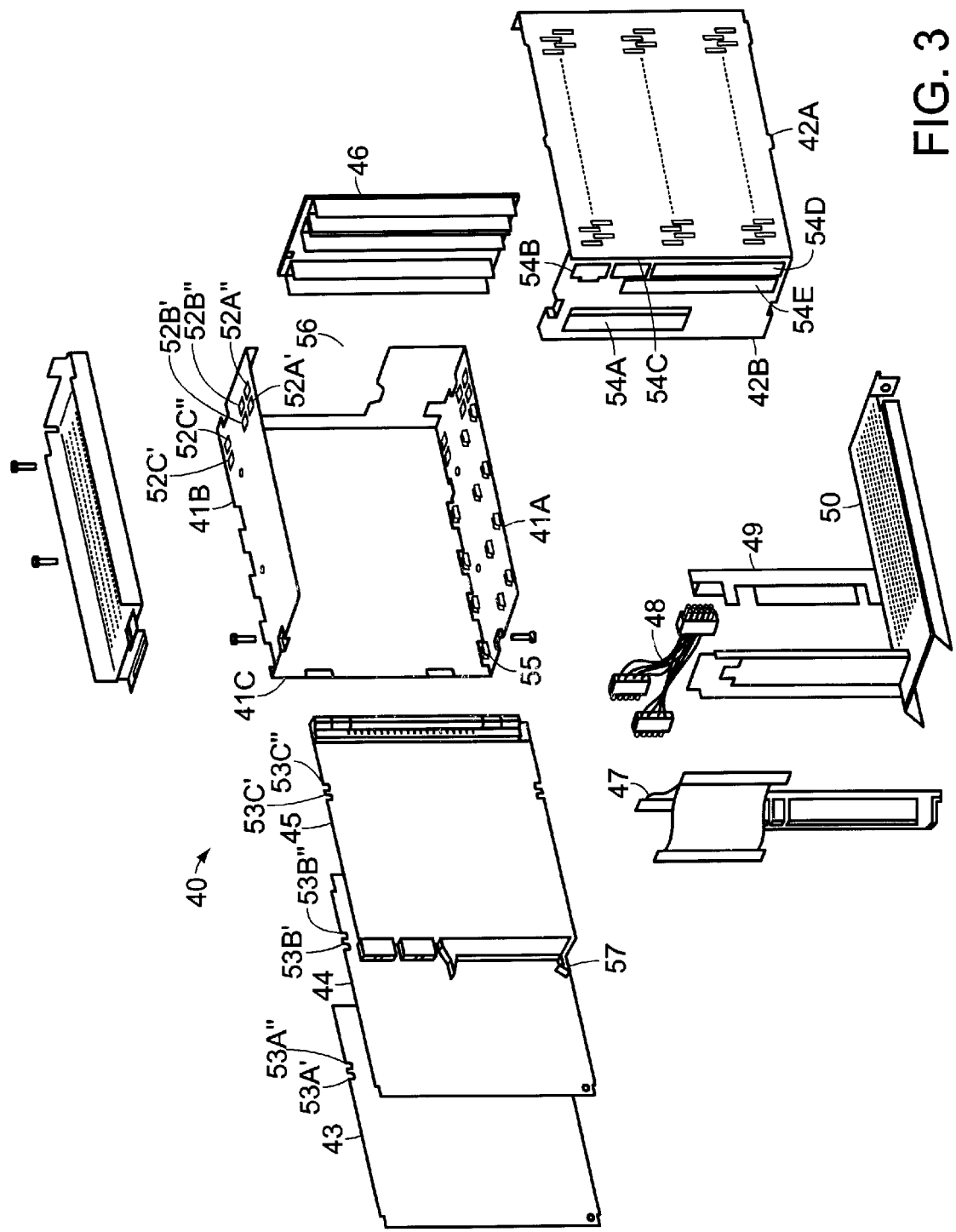
FIG. 3 is an exploded view of a general purpose computer brick.

Referring now to FIG. 3, the second general purpose computer system 19 is packaged in a configuration adapted to be mounted in a standard 5¼ inch disk drive opening. The enclosure for the second general purpose computer 19 is shown to include a vented side panel 42a which allows air flow through the apparatus. A portion of the panel 42b is bent at an angle orthogonal to the air vented portion of the panel and includes five apertures 54a–54e through which the second general purpose computer system 19 receives connections from the general purpose computer system 11 for DSSI bus_0, a Small Computer System Interconnect (SCSI) bus and a Q bus. Through two of the apertures 54b, 54c the second general purpose computer system also receives power from the power supply 27. The opposing side of the general purpose computer apparatus is shown as a solid metal chassis having a pair of side panels 41a, 41b bent at an angle such that the panels 41a, 41b are mutually parallel and orthogonal to the base member 41c. The side panels 41a, 41b have guides 55 which will position here three printed circuit boards 43, 44, 45 disposed within the metal enclosure. Also located on these two side panels 41a, 41b are three pairs of rectangular apertures 52a', 52a", 52b', 52b", 52c', 52c".

At a first end of the general purpose computer apparatus 40 is an area 56 through which access is available to a locking connector disposed within the metal enclosure of the general purpose computer apparatus 40. This locking connector accepts a ribbon cable input located on the back of the control panel 26. Secured to two of the sides of the metal enclosure is additional air vented bracketing 50, 51 which allows the packaged general purpose computer 32 to be inserted into a disk drive opening in a system cabinet 30 as shown in FIG. 2. Further included at one end of the metal enclosure are connectors 46 which the printed circuit boards are plugged into. Additional connectors are found at the opposite end of the CPU module 57, a mate and lock connector 48 to connect to the power supply 27 and a ribbon cable connector 47 with locking tabs to connect to the DSSI bus_0 28 and the SCSI bus of general purpose computer system 11. The opposing end of each of these connectors plugs into a paddle card 49 which physically connects to the backplane within the disk drive slot and logically connects to the SCSI bus and the DSSI bus_0 28 of general purpose computer system 11. Shown is a typical configuration including two DSSI buses, a SCSI bus, a Q bus which is a general purpose I/O bus and an NI bus or ETHERNET bus which is a network bus as will be mentioned. Other configurations of course could be used, provided a bus is made available to interconnect the first general purpose computer to the second general purpose computer.

Figure 4:
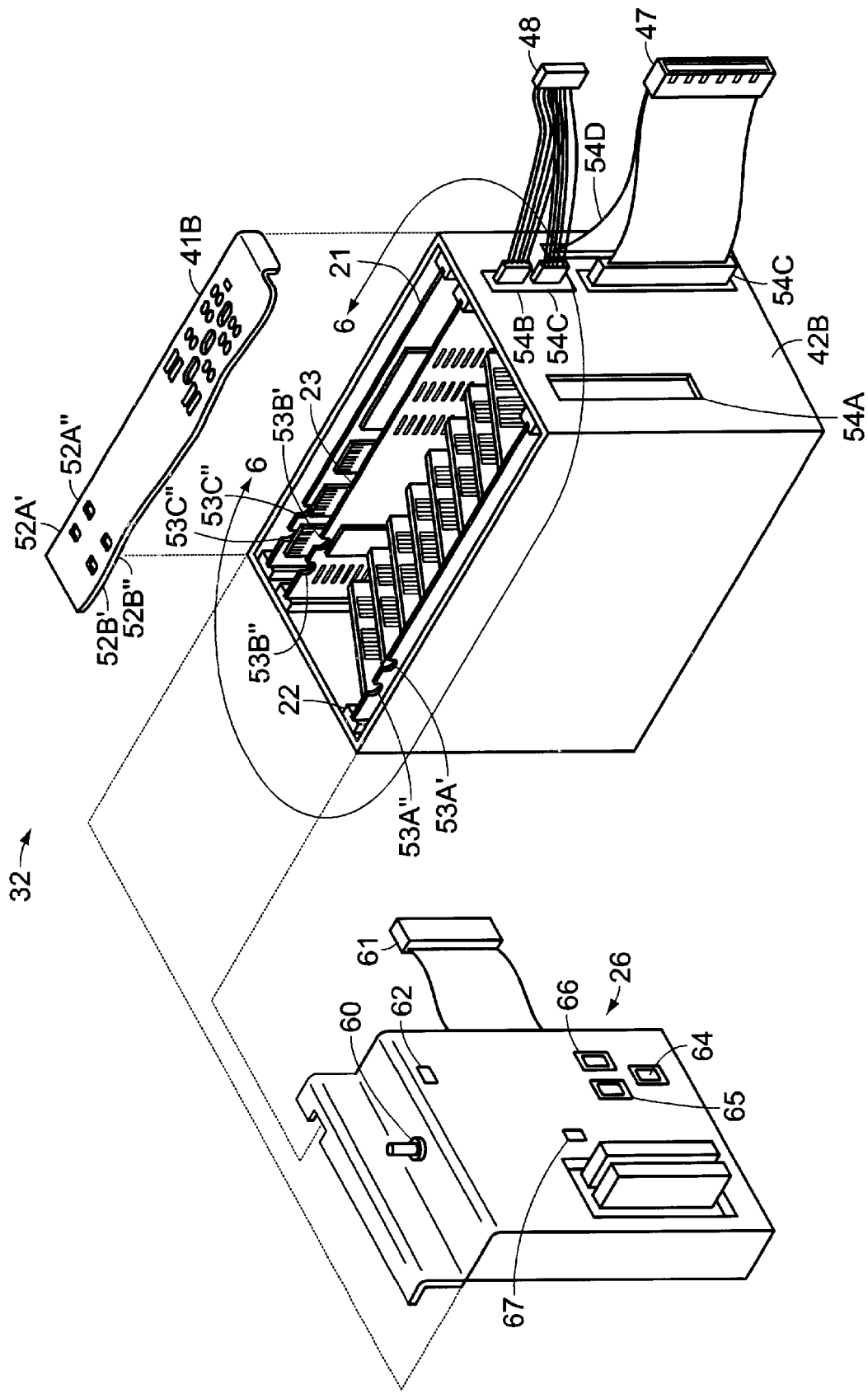
FIG. 4 is an isometric cutaway view of the general purpose computer brick of FIG. 3 showing inner components of the brick.

Referring now to FIG. 4 the assembled general purpose computer 19 packaged as a computer "brick" 32 is shown to include a CPU module 21, an I/O module 23 and eight single inline memory modules plugged at an angle into a memory carrier 22. The CPU module 21 is partitioned to contain the logic for the CPU, the DSSI bus_0 28 and the network interconnect. The I/O module 23 is partitioned to include the logic for I/O operations, DSSI bus_1 and Q bus. The CPU module 21, the I/O module 23 and the memory carrier 22 are each provided with notches 53a', 53a", 53b'. 53b", 53c', 53c" on the edges of the printed circuit board to be used in removing the individual boards from the enclosure as will be described.

Cabling to connect the general purpose computer brick to the existing general purpose computer system housed within the existing cabinet is fed through five apertures 54a–54e at one end of the general purpose computer brick's enclosure. Connections are made to power, DSSI bus$_0$28, SCSI and Q bus through these five apertures 54a–54e. On the opposite end of the brick from these apertures, the operator control panel 26 is connected using a high density ribbon cable 61 into a connector on the general purpose computer brick which includes locking tabs. The operator control panel 26 includes a network interconnect BNC connector 60 here for an NI or ETHERNET bus and a console port. Also included are a reset button (reboot) 66, a halt button 65 and a halt enable switch 62. Two high density dual in-line (DIN) connectors 65, 66 are also included through which peripherals may be connected to the general purpose computer brick's 32 DSSI bus$_1$. The operator control panel also includes a diagnostic display 67 to display any errors the general purpose computer brick 32 might encounter.

Figure 5:
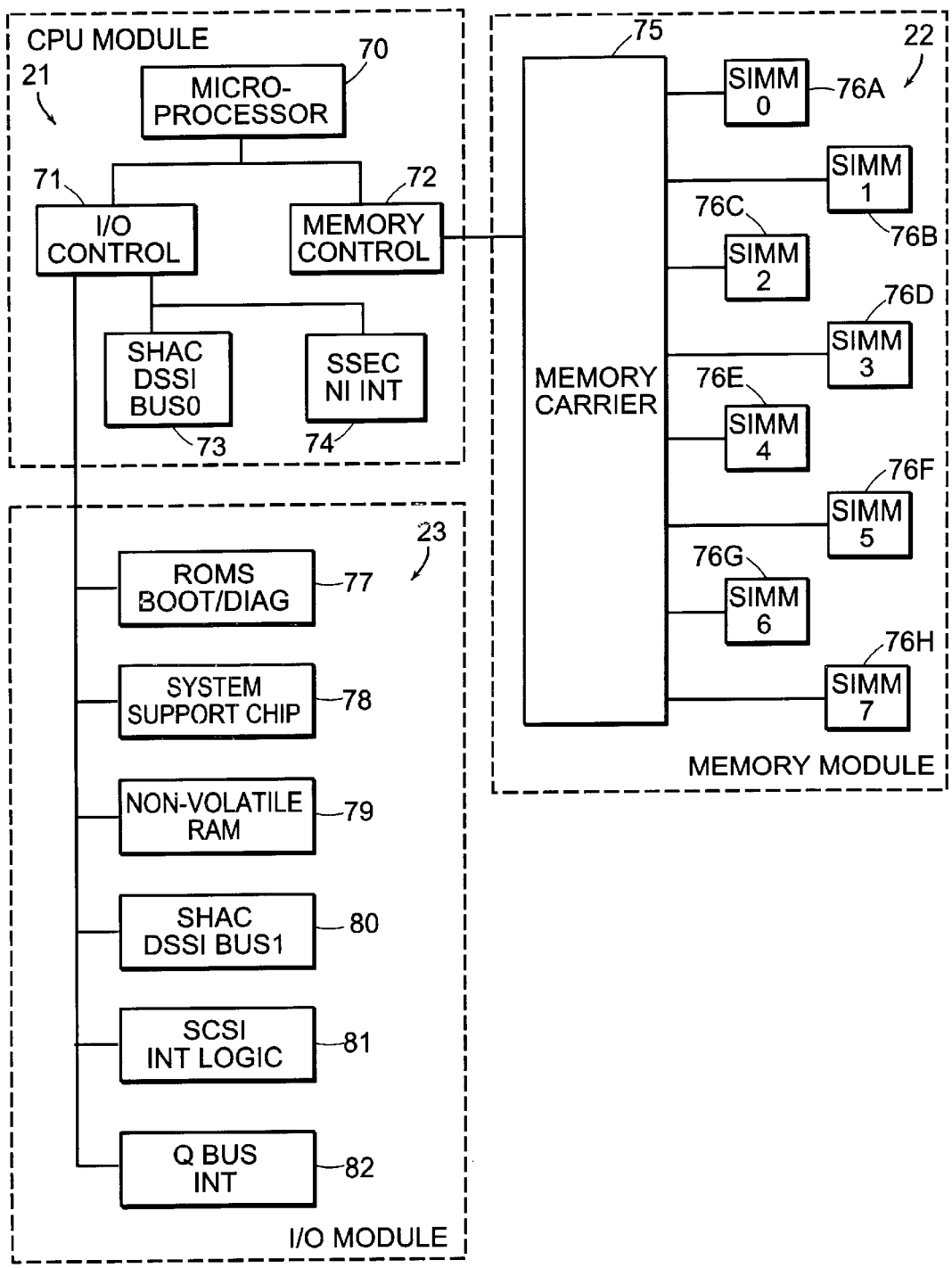
FIG. 5 is a block diagram representing the partitioning of the modules of the general purpose computer brick.

Referring now to FIG. 5, the partitioning of the CPU 21, the I/O 23 and the memory modules 22 of FIG. 4 are shown to include the system microprocessor 70, I/O 71 and memory control 72 and a Single Host Adapter Chip (SHAC) for the DSSI bus_0 interface 73 and a Second Generation Ethernet Chip (SGEC) Network Interconnect interface 74 in the CPU module 21. The memory control 72 on the CPU module 21 is connected into the memory module 22 which includes the memory carrier 75 and the single inline memory modules 76a–76h which provide the main system memory. The I/O control 71 of the CPU module 21 is connected into the I/O module 23 which is partitioned to include the read only memory for the bootstrap and diagnostics code 77. Further included in the partitioning of the I/O module 23 is the system support chip 78 and the non-volatile Random Access Memory 79. Interface logic is also included for an SCSI Bus 81, a Q bus 82 and a SHAC for DSSI Bus 1 80 on the I/O module 23.

Figure 6:
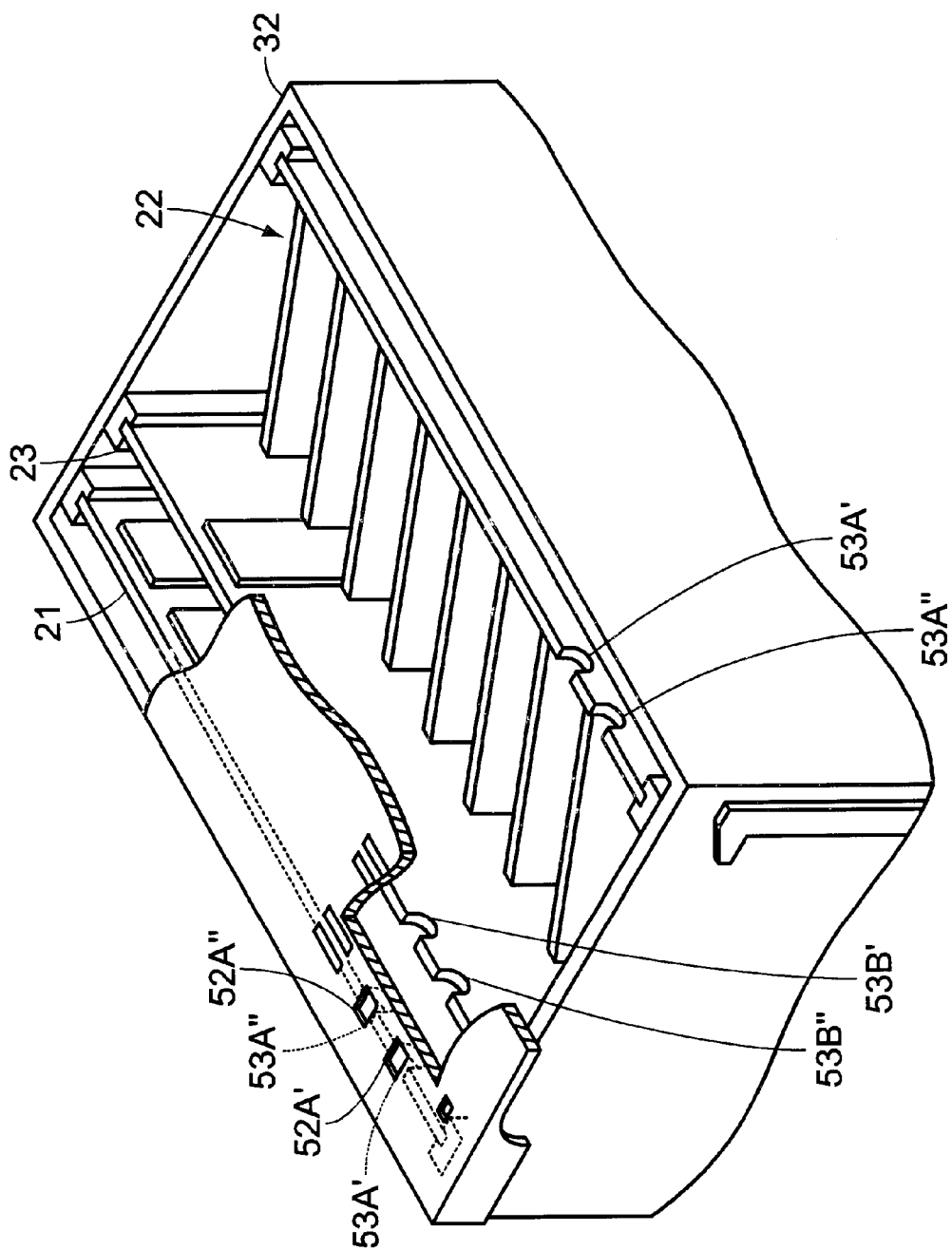
FIG. 6 is an isometric view of the general purpose computer brick depicting a relationship between the apertures in the enclosure of the brick and notches in printed circuit boards disposed in the enclosure.

Referring now to FIG. 6, the brick is shown to include pairs of rectangular apertures 52a', 52a" in proximity to pairs of notches 53b', 53b" on edges of the printed circuit boards 21, 22, 23. When the printed circuit boards 21, 22, 23 are in place within the enclosure of the general purpose computer brick 32 the pair of notches 53a', 53a" on opposing edges of the circuit boards are aligned with apertures 52a', 52a" within the sides of the brick 32. Here the apertures 52a', 52a" are rectangular but of course other shaped apertures could be used. Two flat-headed screwdrivers (not shown) are inserted through the rectangular shaped apertures 52a', 52a" into one of the pair of corresponding notches 53a', 53a" in the circuit board 21 and pressure is placed against the side of the notch to pry or pop the circuit board from its connector. Because of the distance the circuit board must travel in order to be completely freed from the connector, it is preferred to have two rectangular apertures as well as two notches provided in order that the necessary travel may be achieved. The notches are placed in the circuit boards such that when the circuit board is in place within the enclosure half of one of the notches is visible through the rectangular aperture and the second notch is hidden behind the space between the two apertures.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A general purpose computer apparatus comprising:
a central processing unit;
a main memory;
a system bus;
first means for interfacing said central processing unit to said system bus;
second means, coupled to said system bus, for interfacing said central processing unit to an I/O bus; and
a housing enclosing said central processing unit, said main memory, said system bus and said first and second means for interfacing, said housing having a size and a shape so that the housing can be physically mounted in a disk drive slot of a computer system, and including a control panel disposed over a portion of said housing, said control panel having at least one switch with said switch being used to reboot said central processing unit, wherein said second means for interfacing supports a bus protocol that allows communications from one central processing unit to a second central processing unit.

2. The apparatus of claim 1 wherein said bus protocol is a system bus protocol.

3. The apparatus of claim 1 wherein said bus protocol is an I/O bus protocol.

4. The apparatus of claim 3 wherein said bus protocol is a Digital Storage System Interconnect protocol.

5. The apparatus of claim 3 wherein said bus protocol is a Small Computer System Interconnect protocol.

6. The apparatus of claim 1 wherein said bus protocol conforms to an Ethernet protocol standard.

7. A computer system comprising:
   a cabinet having at least one slot for receiving a disk drive;
   a first general purpose computer apparatus disposed in said cabinet, said first general purpose computer apparatus including:
     a first central processing unit;
     a system bus;
     an I/O interface module coupled to said system bus for interfacing said system bus to an I/O bus; and
   a second general purpose computer apparatus including:
     a second central processing unit;
     a main memory;
     means for interfacing said second general purpose computer apparatus to said first general purpose computer apparatus; and
     a housing enclosing said second general purpose computer apparatus, said housing having a size and shape so that the housing can be physically mounted in said slot for receiving a disk drive, with said housing disposed in said slot.

8. A computer system as in claim 7 wherein said means for interfacing provides for communication between said first general purpose computer apparatus and said second general purpose computer apparatus.

9. A computer system as in claim 7 wherein said means for interfacing provides for communication between said first central processing unit and said second central processing unit.

10. A computer system as in claim 7, said means for interfacing comprising means for interfacing said second central processing unit to said I/O interface module of said first general purpose computer apparatus.

11. A computer system as in claim 7, said second general purpose computer apparatus further including:
    a control panel disposed over a portion of said housing, said control panel having at least one switch.

12. A computer system as in claim 11, wherein said switch is used to reboot said second central processing unit and said first general purpose computer apparatus further including a second switch, said second switch being used to reboot said first central processing unit.

13. A computer system as in claim 7 further including:
    a power supply disposed in said cabinet wherein said power supply provides power to said first general purpose computer apparatus and said second general purpose computer apparatus.

14. A computer system comprising:
    a cabinet for housing said computer system, said cabinet having a panel with at least two disk drive openings in said panel of said cabinet;
    a power supply disposed within said cabinet;
    a first general purpose computer disposed within said cabinet further comprising:
      a first central processing unit module including a central processing unit;
      a main memory;
      an I/O adapter interface;
      a system bus coupling said first central processing unit module to said main memory and said I/O adapter interface;
    a disk drive disposed in a first one of said disk drive openings in said panel of said cabinet;
    a second general purpose central processing unit module disposed in a second one of said disk drive openings in said panel of said cabinet; and
    a control panel having at least one switch which is used to reboot said second central processing unit module;
    wherein said first central processing unit module and said second central processing unit module receive power from said power supply.

* * * * *